(12) United States Patent
Lang

(10) Patent No.: US 12,040,689 B2
(45) Date of Patent: Jul. 16, 2024

(54) ELECTRIC VEHICLE WITH ENERGY RECOVERY SYSTEM

(71) Applicant: Audi AG, Ingolstadt (DE)

(72) Inventor: Markus Lang, Schernfeld (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/835,797

(22) Filed: Jun. 8, 2022

(65) Prior Publication Data

US 2022/0399783 A1 Dec. 15, 2022

(30) Foreign Application Priority Data

Jun. 9, 2021 (DE) .......................... 102021114792.1

(51) Int. Cl.
| | |
|---|---|
| *H02K 7/18* | (2006.01) |
| *B60K 6/30* | (2007.10) |
| *B60K 6/387* | (2007.10) |
| *F02B 63/04* | (2006.01) |
| *B60K 6/383* | (2007.10) |

(52) U.S. Cl.
CPC ............. *H02K 7/1884* (2013.01); *B60K 6/30* (2013.01); *B60K 6/387* (2013.01); *F02B 63/041* (2013.01); *B60K 6/383* (2013.01)

(58) Field of Classification Search
CPC . H02K 7/1884; F02B 63/041; B60H 1/00278; B60L 50/75; F01K 27/02; F01K 15/02
See application file for complete search history.

(56) References Cited

U.S. PATENT DOCUMENTS

| | | | |
|---|---|---|---|
| 6,457,308 B1 | 10/2002 | Lin et al. | |
| 2010/0283263 A1* | 11/2010 | Schilling ................ | F01B 23/10 |
| | | | 290/1 R |
| 2015/0075163 A1* | 3/2015 | Frank ..................... | F01K 23/14 |
| | | | 60/618 |
| 2015/0122607 A1* | 5/2015 | Vogel ..................... | F16D 27/08 |
| | | | 192/35 |
| 2018/0257479 A1* | 9/2018 | Zhou ..................... | B60L 15/007 |
| 2020/0392883 A1 | 12/2020 | Semke et al. | |

FOREIGN PATENT DOCUMENTS

| | | | |
|---|---|---|---|
| CN | 110863874 | * | 3/2020 |
| CN | 110863874 A | * | 3/2020 |
| DE | 102010007911 A1 | | 8/2011 |
| DE | 102014019657 A1 | | 6/2016 |
| DE | 102016217743 A1 | | 3/2018 |
| DE | 102019115909 A1 | | 12/2020 |
| DE | 102019009037 A1 | | 6/2021 |

\* cited by examiner

*Primary Examiner* — Syed O Hasan
(74) *Attorney, Agent, or Firm* — Seed IP Law Group LLP

(57) ABSTRACT

A vehicle may include an electromechanical energy recovery system and be configured to perform a method for its operation.

8 Claims, 1 Drawing Sheet

ELECTRIC VEHICLE WITH ENERGY RECOVERY SYSTEM

BACKGROUND

Technical Field

Embodiments of the present invention relate to an electromechanical energy recovery system in an electric vehicle and a method for its operation.

Description of the Related Art

In present-day vehicles, rotary electrical motors are used in various subassemblies. These motors are used almost exclusively to generate mechanical work. No energy recovery is possible except in the case of belt starter generators and rotary current motors in hybrid transmission/drive motors in E-vehicles.

The thermal work is not utilized for energy recovery for other applications in the vehicle. This energy potential is generally surrendered to the surroundings as waste heat in every vehicle. At present, there is only an effort to store a certain heat capacity in order to economize on the heating power for the vehicle in the winter. If one considers the power of the E-drives and the efficiencies of the drives, a high potential for energy recovery is available.

DE 10 2014 019 657 A1 concerns a vehicle with at least one internal combustion engine, a waste heat utilization device, and a control unit for operating the waste heat utilization device. The waste heat utilization device is based on a thermodynamic cycle process, the so-called Clausius-Rankine cycle. In this process, a working medium is transported in a circulation. A pump is integrated in the circulation for the transport of the working medium, by means of which the working medium in fluid form is delivered to an evaporator, in which the working medium is evaporated. For this, the evaporator may be coupled to the exhaust gas line of the internal combustion engine. The evaporator may function like a heat exchanger, removing heat from the exhaust gas of the internal combustion engine, and the working medium is evaporated by means of this heat. The heated and evaporated working medium, standing at rather high pressure, is taken from the evaporator via the circuit to a fluid energy machine arranged therein. In the fluid energy machine, the heated and evaporated working medium is expanded, whereupon thermal energy is removed from it and converted into mechanical energy. The fluid energy machine may be designed, for example, as a scroll expander, a piston expander, or a turbine. In one embodiment, a generator is driven by means of the fluid energy machine, being part of the waste heat utilization device designed as a waste heat current generator. Likewise, in addition or alternatively, it may be provided that the mechanical energy is utilized as such. The expanded vapor is taken from the fluid energy machine to a condenser, which is likewise integrated in the circuit. In the condenser, the vapor is condensed, i.e., liquefied, and then the working medium in the fluid state is supplied once more to the pump via the circuit.

DE 10 2016 217 743 A1 discloses a system for an internal combustion engine of a vehicle encompassing a waste heat recovery system and a recuperation system. The waste heat recovery system comprises a circuit carrying a working medium. The circuit comprises, in the flow direction of the working medium, a fluid feed pump, an evaporator, an expansion machine and a condenser. The expansion machine is mechanically connected to a generator. The recuperation system comprises an electrical machine, which can be connected to a crankshaft of the internal combustion engine by means of a transmission element. The generator and the electrical machine are electrically connected to a common energy accumulator. The waste heat recovery system and the recuperation system have a common control logic.

From DE 10 2010 007 911 A1 there is known a drive unit of a motor vehicle having an internal combustion engine coupled to a power takeoff shaft and having a waste heat utilization system, by which at least a portion of waste heat carried away from the internal combustion engine and/or from an exhaust gas system connected to the internal combustion engine is converted into electrical energy by means of a thermally operated energy converter, which can be taken at least partially to a secondary consumer and/or an onboard electrical network of the motor vehicle. In addition to the waste heat utilization system, there is provided a further heat source, by which the thermally operated energy converter can be supplied with heat.

BRIEF SUMMARY

Given this background, embodiments of the invention provide devices and methods with which the energy efficiency of an electric vehicle can be further improved.

Some embodiments of the invention include an electric vehicle, comprising a device for converting waste heat of at least one electrical machine and/or at least one energy accumulator of the electric vehicle into mechanical and/or electrical energy.

In one embodiment, the electric vehicle comprises a device for converting waste heat of at least one electrical machine and/or at least one energy accumulator of the electric vehicle into mechanical and/or electrical energy.

According to some embodiments of the invention, the thermal waste heat accruing from the operation of the vehicle is utilized to generate a gas pressure, in order to make possible an energy recovery. In one embodiment, there is installed in the vehicle a combination of a mechanical motor and electrical motor (combi-generator). A mechanical drive can come from the waste heat of the drive motors or the accumulator for electrical energy. By evaporation of a working medium with low boiling point and high vapor pressure, it is possible to build up a pressure potential relative to the surroundings, which can be utilized to drive this motor.

In another embodiment, a gas expansion turbine (expander) is installed in the vehicle, which uses the gas pressure so generated for the energy recovery. The expander can provide an additional mechanical moment for the driving of the vehicle and/or drive a generator in order to generate electrical energy, which is supplied to an accumulator of the vehicle and/or a traction motor of the vehicle.

The device for converting of waste heat into mechanical and/or electrical energy comprises in another embodiment a combi-generator, encompassing a gas-operated (pneumatic) mechanical linear motor and an electrical machine which can be mechanically coupled to it.

The combi-generator connects a mechanical linear motor (pressure chamber, piston, damping, piston rod) to an electrical motor (stator, rotor) via a coupling and a common mounting with freewheels.

In one embodiment of the combi-generator, a piston rod of a linear piston of the gas-operated, pneumatic, mechanical linear motor is axially mounted in freewheels with guide curves, which convert a linear movement of the piston rod into a rotary movement of a rotor of the electrical machine.

A rotary movement and a mechanical torque are generated by the stroke of the piston and the angular momentum of the guide curve.

The piston rod may be hollow, for better cooling. This makes possible an active cooling in a separate cooling circuit, optionally with the E-machine, or a passive cooling via a sodium filling, etc.

The combination of a mechanical linear motor with an electrical drive enables various possible applications. Thanks to the use of a coupling and a control unit, various possible applications can be presented:

tapping of purely mechanical work in the form of the linear movement,
generating a purely mechanical rotary movement,
generating electrical energy (energy recovery),
economizing of electrical energy, because the mechanical movement is superimposed with the electrical drive, so that an additional torque is introduced.

In one embodiment, the at least one energy accumulator comprises at least one high voltage (HV) battery. In another embodiment, the at least one energy accumulator comprises at least one fuel cell.

The combi-generator requires a heating and cooling circuit in which an evaporable working medium circulates. In one embodiment, the combi-generator comprises a separate first heating and cooling circuit, in which an evaporable working medium circulates. The heat transfer from the at least one electrical machine (traction motor) and/or the at least one accumulator for electrical energy (e.g., HV battery, fuel cell) occurs via a second cooling circuit, in which a fluid heat transfer agent circulates (e.g., a silicone oil). The heat exchange between the two circuits occurs via a heat exchanger/evaporator. After the expansion work in the combi-generator, the working medium is again condensed and supplied to the evaporator. A pressure accumulator is also conceivable for balancing out peak power and so forth in the first circuit. This should be determined according to the design of the system and its requirements or tasks. Furthermore, the possibility also exists of supplying thermal energy from outside the vehicle, in order to convert this into mechanical work and/or electrical energy and make it available in the vehicle.

In another embodiment, the device for converting of waste heat of at least one electrical machine and/or at least one energy accumulator of the electric vehicle into mechanical and/or electrical energy is incorporated in a single heat transfer circuit, in which an evaporable working medium circulates. Waste heat of at least one heat source, i.e., the at least one electrical machine (traction motor) and/or the at least one accumulator for electrical energy (e.g., HV battery, fuel cell) is taken up from the fluid working medium. The fluid working medium is taken to an evaporator, evaporated, and supplied to the device for converting of waste heat (e.g., combi-generator or expander). After the expansion work in the device for converting of waste heat, the working medium is once more condensed in a condenser and taken back to the heat source or the heat sources.

In one embodiment, the device for converting of waste heat into mechanical and/or electrical energy comprises a circuit, in which a working medium circulates, which has a boiling point of not more than 80° C. at 1013.25 hPa.

The working medium must have a boiling point at normal pressure making possible an evaporation of the working medium and a buildup of excess pressure at the temperatures prevailing in the normal operation of the electric vehicle in the at least one electrical machine, i.e., the traction motor or the traction motors of the electric vehicle, or in the at least one accumulator for electrical energy. These temperatures are generally less than 100° C.

Basically, the possible working medium may be, for example, hydrocarbons such as n-butane, n-pentane, isopentane or neopentane, or fluorohydrocarbons such as 1,1,1,2-tetrafluorethane (R134a). 1,1,1,3,3-pentafluorpropane (R245fa), or 2,3,3,3-tetrafluorpropene (R1234yf). However, because of their flammability or their fluorine content, these have certain disadvantages. In one special embodiment, the working medium is carbon dioxide. In another special embodiment, the working medium is ethanol.

Both the control of the necessary cooling circuits and the control of the combined machine occur via a computing unit. For this, the usual metered quantities of temperature, pressure, and rotary speed are determined and regulated by respective sensors.

In one embodiment, the computing unit is part of an integrated control system of the electric vehicle, also having access to all sensor metered data and data of a navigation system of the vehicle. This makes possible a forward-looking control process of the device for converting waste heat, which can compensate for the inertia of the overall system comprising one or two heat circuits, predict the expected quantities of waste heat and factor them into the control process, and furthermore ensure that the necessary amounts of heat are available for an expected heating demand.

Another subject matter of some embodiments of the invention is a method for operating an electric vehicle, in which the waste heat of at least one electrical machine and/or at least one energy accumulator of the electric vehicle is converted into mechanical energy and utilized to drive the electric vehicle and/or converted into electrical energy and supplied to at least one electrical machine and/or at least one energy accumulator of the electric vehicle.

In one embodiment of the method, the waste heat is used to evaporate a working medium and the gaseous working medium drives a combi-generator, as described above.

With the device according to some embodiments of the invention and the method according to some embodiments of the invention, the waste heat arising during the operation of an electric vehicle can be utilized in order to support the drive of the vehicle by an additional torque and/or to save or recover electrical energy. Further benefits and embodiments will emerge from the specification and the accompanying drawings.

It will be understood that the previously mentioned features and those yet to be explained in the following can be used not only in the particular indicated combination, but also in other combinations or standing alone, without leaving the scope of the present invention.

BRIEF DESCRIPTION OF THE SEVERAL VIEWS OF THE DRAWINGS

Embodiments of the invention are presented as examples with the aid of configurations in the enclosed drawings and will be further described with reference to the drawings.

DETAILED DESCRIPTION

Figure 1:
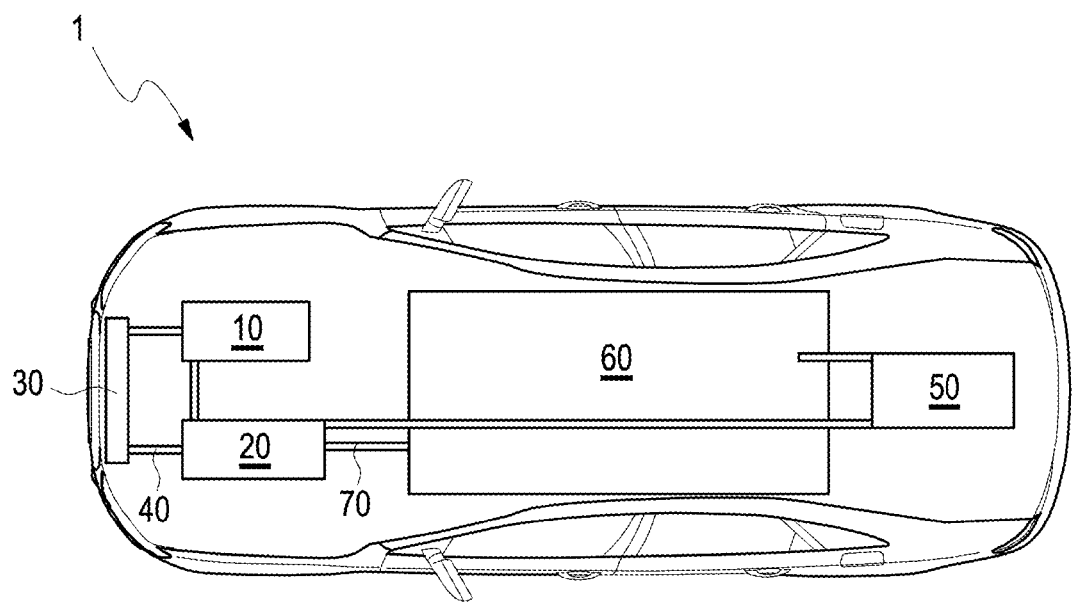
FIG. 1 shows one embodiment of an electric vehicle.

FIG. 1 shows schematically one embodiment of the electric vehicle 1 according to an embodiment of the invention. The electric vehicle 1 comprises a combi-generator 10 for converting thermal energy into mechanical and/or electrical energy, being connected by pipelines of a circuit 40, in which an evaporable working medium circulates, to a heat exchanger/evaporator 20 and a condenser 30. The heat exchanger/evaporator 20 is connected to a heat transfer circuit 70, which takes heat away from a traction motor 50 and a HV battery 60 of the electric vehicle. In the heat exchanger/evaporator 20, the heat of the heat transfer agent circulating in the heat transfer circuit 70 is used to evaporate the working medium circulating in the circuit 40. The gaseous working medium is utilized in the combi-generator 10 to perform mechanical work and/or to generate electrical current. After the expansion work in the combi-generator 10, the working medium is again condensed in the condenser 30 and taken to the evaporator 20.

Figure 2:
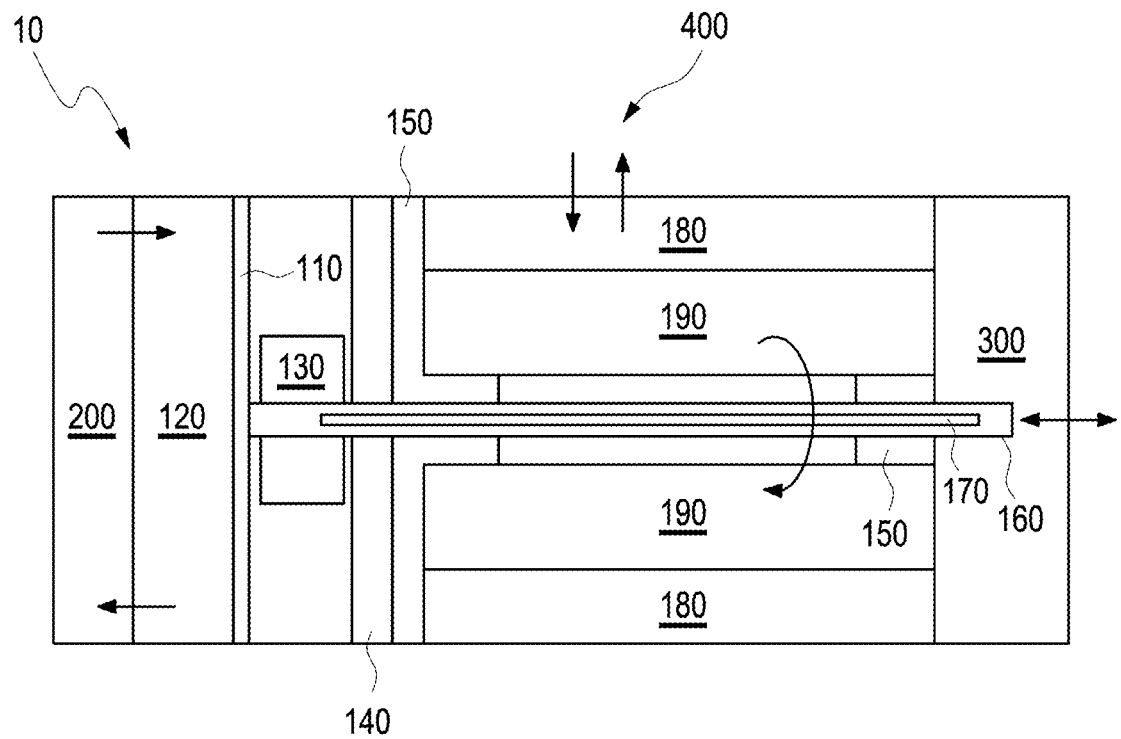
FIG. 2 shows one embodiment of a combi-generator for converting thermal energy into mechanical and/or electrical energy.

FIG. 2 shows schematically one embodiment of a combi-generator 10 for converting thermal energy into mechanical and/or electrical energy. The combi-generator 10 comprises a linear piston 110 having a piston rod 160, arranged movably in a pressure chamber 120. A regulating unit 200 regulates the current of the gaseous working medium into the pressure chamber 120 or out from this (symbolized by arrows in the drawing). A damping element 130, which may be for example a damping volume or a mechanical spring, creates a restoring force upon movement of the linear piston 110. Across the system connection 300, a linear or radial movement of the piston rod 160 can be utilized to perform mechanical work.

The combi-generator 10 furthermore comprises an electrical machine having a stator 180 and a rotor 190. The feeding or tapping of electrical energy 400 to and from the electrical machine (symbolized by arrows in the drawing) occurs across electrical contacts.

The piston rod 160 of the linear motor is mounted axially in freewheels 150, which have guide curves generating a rotary movement of the rotor 190 upon linear movement of the piston rod 160, when the friction clutch 140 connects the freewheel 150 to the housing.

The combi-generator 10 connects a mechanical linear motor (pressure chamber 120, piston 110, damping 130, piston rod 160) across a coupling 140 to an electrical machine (stator 180, rotor 190) and a common mounting with freewheels 150. The piston rod 160 is axially mounted in the freewheels 150 and guided by a guide curve. A rotary movement and a mechanical torque are generated by the stroke of the piston 110 and the angular momentum of the guide curve.

When the coupling 140 is open, a linear movement of the piston rod 160 can be mechanically tapped. The freewheel 150 cannot generate any torque, since there is no bracing against the housing. When the coupling 140 is closed, a rotary movement of the rotor 190 is generated. If the electrical machine is working in generator mode, the torque will be used to generate electrical current. In an alternative variant, the electrical machine is used additionally as a drive, and there will be a superimposing of the mechanical torques generated by the linear motor and the electrical machine.

The piston rod 160 may be hollow, for better cooling. The cavity 170 allows an active cooling in a separate cooling circuit, optionally with the E-machine, or a passive cooling via a sodium filling, etc.

Both the control of the required cooling circuits and the control of the combi-generators 10 are done through a computing unit, not represented. For this, the usual metered quantities of temperature, pressure, and rotary speed are determined and regulated by respective sensors.

German patent application no. 10 2021 114 792.1, filed Jun. 9, 2021, to which this application claims priority, is hereby incorporated herein by reference, in its entirety. Aspects of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric vehicle, comprising:
a device for converting waste heat of at least one electrical machine and/or at least one energy accumulator of the electric vehicle into mechanical and/or electrical energy,
wherein the device for converting waste heat into mechanical and/or electrical energy comprises a combi-generator, encompassing a gas-operated, pneumatic, mechanical linear motor and an electrical machine mechanically coupleable to the combi-generator, and
wherein a piston rod of a linear piston of the gas-operated, pneumatic, mechanical linear motor is axially mounted in freewheels with guide curves, which convert a linear movement of the piston rod into a rotary movement of a rotor of the electrical machine.

2. The electric vehicle according to claim 1, wherein the at least one energy accumulator comprises at least one high-voltage battery.

3. The electric vehicle according to claim 1, wherein the at least one energy accumulator comprises at least one fuel cell.

4. The electric vehicle according to claim 1, wherein the device for converting of waste heat into mechanical and/or electrical energy comprises a circuit, in which a working medium circulates, which has a boiling point of not more than 80° C. at 1013.25 hPa.

5. The electric vehicle according to claim 4, wherein the working medium is carbon dioxide.

6. The electric vehicle according to claim 4, wherein the working medium is ethanol.

7. A method for operating an electric vehicle, comprising:
converting waste heat of at least one electrical machine and/or at least one energy accumulator of the electric vehicle into mechanical energy, and utilizing the mechanical energy to drive the electric vehicle; and/or
converting waste heat of the at least one electrical machine and/or the at least one energy accumulator of the electric vehicle into electrical energy, and supplying the electrical energy to at least one electrical machine and/or at least one energy accumulator of the electric vehicle,
wherein the device for converting waste heat into mechanical and/or electrical energy comprises a combi-generator, encompassing a gas-operated, pneumatic, mechanical linear motor and an electrical machine mechanically coupleable to the combi-generator, and
wherein a piston rod of a linear piston of the gas-operated, pneumatic, mechanical linear motor is axially mounted in freewheels with guide curves, which convert a linear movement of the piston rod into a rotary movement of a rotor of the electrical machine.

8. The method according to claim 7, in which the waste heat is used to evaporate a working medium and the gaseous working medium drives a combi-generator or an expander.

* * * * *